United States Patent [19]

Sommer

[11] Patent Number: 4,920,808
[45] Date of Patent: May 1, 1990

[54] DEVICE AND METHOD FOR MEASURING THE FLOW VELOCITY OF A FREE FLOW IN THREE DIMENSIONS

[76] Inventor: Roland Sommer, 6231 Schwalbach/Taunus, Kronthaler Weg, Fed. Rep. of Germany, 15

[21] Appl. No.: 146,830

[22] PCT Filed: Apr. 24, 1987

[86] PCT No.: PCT/DE87/00182
§ 371 Date: Jan. 12, 1988
§ 102(e) Date: Jan. 12, 1988

[87] PCT Pub. No.: WO87/06710
PCT Pub. Date: Nov. 5, 1987

[30] Foreign Application Priority Data

Apr. 24, 1986 [DE] Fed. Rep. of Germany ....... 3613867
Oct. 6, 1986 [DE] Fed. Rep. of Germany ....... 3634005

[51] Int. Cl.$^5$ .............................................. G01F 1/34
[52] U.S. Cl. ................................ 73/861.42; 73/202.5; 73/189
[58] Field of Search ................... 73/182, 189, 861.42, 73/861.52, 861.61, 861.63, 861.65, 861.66, 202, 202.5, 204.21, 204.22

[56] References Cited

U.S. PATENT DOCUMENTS

| 2,101,858 | 12/1937 | Knisley | 73/182 |
| 3,000,213 | 9/1961 | Eves et al. | 73/204.21 X |
| 3,094,868 | 6/1963 | Andersen, Jr. et al. | 73/182 X |
| 3,559,482 | 2/1971 | Baker et al. | 73/202 X |
| 3,699,811 | 10/1972 | Maiden et al. | 73/182 X |
| 3,751,982 | 8/1973 | Lambert | 73/861.66 |
| 4,476,720 | 10/1984 | Ismail et al. | 73/202.5 |

FOREIGN PATENT DOCUMENTS

| 1920699 | 11/1969 | Fed. Rep. of Germany . | |
| 938081 | 9/1963 | United Kingdom | 73/861.65 |
| 2032118 | 4/1980 | United Kingdom | 73/861.65 |

Primary Examiner—Herbert Goldstein
Attorney, Agent, or Firm—Helfgott & Karas

[57] ABSTRACT

A device for and method of measuring the flow velocity of a free fluid flow in three dimensions is provided in which a rotationally symmetrical flow body has at least two sets of peripherally spaced openings in regions of different thickness along the side of the body, with one of the sets preferably at or near the thickest region. Each set of openings communicates with a separate internal chamber in which the static pressure of the fluid from its openings is measured. In accord with the method of the invention, the differences in the static pressure thus obtained from the fluid flow past the positions of different thickness along the side of the flow body is used to determine the velocity of the flow.

17 Claims, 5 Drawing Sheets

DEVICE AND METHOD FOR MEASURING THE FLOW VELOCITY OF A FREE FLOW IN THREE DIMENSIONS

The invention concerns a method for measuring the flow velocity of a free flow in three dimensions and a device with which this method can be carried out.

The method and the device of the invention are used, on the one hand, as a fixed probe for measuring the velocity of the medium which flows around the probe and, on the other hand, as a moving probe, for example on flying bodies, ships, land vehicles or the like while they move through a medium, for example air, to measure the relative velocity between the body carrying the probe and the medium. In the latter case, the probe is therefore used, in other words, to measure the velocity of an aircraft, a ship, a land vehicle or the like. In addition, the measurement of flows in pipework, for example in the chemical field, offers many possibilities of application.

As long as vehicles exist, it is necessary to measure the velocity of the vehicles. Particularly in the case of aircraft, knowledge of the velocity is important. There are also, however, many other technical problems in which flowing media have to be measured. The measurement units which have long been known were: Pressure probes which are used to measure the static pressure at any given point within a flow and consist, for example, of a tube rounded at the front with small holes or an annular slot at the sides. The openings, i.e. the holes or the annular slot, must be located outside the accelerated flow influenced by the tip of the probe, and the probe only measures correctly in the case of exactly axial incident flow. This small blowing angle is often a disadvantage in practical use.

Pitot tubes measure the total pressure in the special case where this is equal to the dynamic pressure (sic) if the flow is completely brought to rest in a stagnation tube.

Prandtl stagnation tubes are combinations of a pitot tube with a pressure probe necessary for measuring the static pressure and permit the determination of the dynamic pressure as the difference between the total pressure and the measured static pressure, from which the incident flow velocity can in turn be determined. It is found computationally as the square root of the pressure difference (total pressure minus static pressure) divided by the density of the medium.

Even in the case of the Prandtl stagnation tubes, accurate measurements can only be achieved with practically axial incident flow. One important reason for this, among others, is that the opening or openings for measuring the static pressure are relatively distant spatially from the dynamic pressure measurement opening. It is therefore only in the case of quite even flow around the Prandtl tube in the axial direction that exact measurement results can be achieved.

Finally, Venturi tubes are also used for measuring the velocities of the flow through them. A Venturi tube is a tube provided with a throat and having axial flow through it. A pressure gauge is used to measure the static pressure difference between a position at which the flow is still substantially laminar and a position at the throat. In the case of a frictionless and inviscid fluid, the flow velocity in the part of the tube with laminar flow is obtained by applying the continuity equation and the Bernoulli equation, as the square root of the difference between the static pressures, divided by the density of the flow medium, and of a geometry factor of the Venturi tube.

On the basis of a known Venturi tube for measuring the flow velocity in a tube, a method and a device are produced for measuring the flow velocity of a free flow in three dimensions, which method and device can be used over a large angular range relative to the flow direction or the blowing direction and which, in special embodiment forms, make it possible to determine the flow velocity without knowledge of the density of the flowing medium.

This objective is achieved by means of a method and device, including advantageous embodiments of this device according to the invention, as described in this specification and claims.

In the method of the invention, static pressures are measured at two longitudinally different positions on a flow body of varying thickness and their difference is formed, or the difference between these static pressures is measured directly, a first measuring position being located at or near the thickest portion of the flow body and the other measuring position being located at a thinner position of the flow body located upstream or downstream, and the velocity of the flow is then given by the square root of the pressure difference determined or directly measured, divided by the density of the flowing medium, and by a geometry factor which depends on the shape of the flow body.

A hollow rotationally symmetrical measuring head is preferably used as the flow body and this is subdivided internally into two chambers. The holes of the first measuring position end in one chamber while the holes of the other measuring position end in the other chamber so that the static pressure corresponding to the first measuring position appears in the first chamber and the static pressure corresponding to the second measuring position occurs in the second chamber.

It has been found that the device for measuring the flow velocity in accordance with the invention can be used over a large angular range of incident flow blowing angle and supplies good measurement results. Provided the flow is even over a large range, the simple measurement probe, consisting of a measurement head in the form of a flow body which is provided with measurement holes or an annular slot at two peripheral positions, supplies good measurement results of the flow velocity within a large range of blowing or flow angle. If the flow is more uneven, it has been found desirable to surround the measuring head with a ring so that the flow is detected in the annular duct between the surface of the measurement head and the internal surface of the ring. Such a ring evens out the flow and supplies velocity values which are very reproducible even in the case of uneven flow around the measurement probe.

In the latter case, the flow duct through which the flow to be measured flows is an annular duct which contracts (at the thickest position of the flow body) and then spreads out again.

The selection, for the ring, of the shape, including the diameter, of the cross-section, of the variation in cross-section and of the position relative to the flow body depends on various parameters such as the shape of the flow body, the position of the measurement openings or slots for measuring the pressures occurring, the expected flow velocities, the type, density and evenness of the flowing medium, etc. The specialist will therefore generally determine the shape and position of the ring experimentally.

An important parameter for the properties of the measurement probe is, for example, the distance between the ring and the surface of the flow body. It acts, on the one hand, to concentrate and even out the flow to be measured and, on the other, to modify the measurement range. When the distance between the flow body and the inner surface of the ring is reduced, the streamlines are crowded together greatly at the first measuring position (for the same front opening of the annular gap) and the pressure difference $p_1-p_2$ can therefore be increased, for an appropriate position of the second measuring position, so that smaller flow velocities can be measured. On the other hand, less contraction of the flow entering the open inlet area of the annular gap leads to smaller pressure differences $p_1-p_2$ so that the measurement probe becomes, overall, less sensitive.

The geometrical shape of the front end surface of the aerodynamic body is also of considerable importance to the measurement ranges over which the measurement probe of the invention operates correctly. In the case where small flow velocities (in the subsonic range) have to be measured, it is desirable to design the front end surface substantially as a spherical cap. When the flow arrives at the probe, this gives the advantages provided by flow around a sphere, such as the small separation of the flow from a spherical surface. This is also probably one of the reasons for the high blowing angles at which measurement can be achieved with the probe according to the invention.

When flow velocities in the transition range between subsonic and supersonic have to be measured, the front end surface of the measurement probe is preferably given the shape of a streamline body, a substantially elliptical shape with an axis ratio of 1:1.6 giving the additional advantage that the probe is then independent of the Reynolds number Re.

In the supersonic range of a flow to be measured, a typically pointed supersonic profile, such as is known from fluid mechanics, is found to be advantageous for the shape of the front end surface of the flow body of the measurement probe according to the invention.

Although the method described and the device described are themselves sufficient for providing flow measurements in angular ranges up to ±30° and more with good accuracy and reproducibility, there is often the requirement to measure the flow velocity accurately desite the need to deal with even larger flow direction measurement ranges or greatly varying incident flow directions. Thus, for example, measurement of the motion is a veryy difficult problem in helicopters. On the one hand, the determination of the motion is an extremely important measurement in helicopters whereas, on the other, it is difficult to make this particular measurement by using probes rigidly attached to the helicopter, because the helicopter executes changes in motion due to rotation about its transverse axis so that the measurement probe rotates with it. The probe is often rotated to such an extent that its central axis is rotated out of the measurement range relative to the flow direction.

In accordance with an advantageous embodiment of the method according to the invention, which permits an accurate measurement of the flow velocity even in the case of strongly fluctuating incident flow directions, the flow body is aligned in the flow by means of a servo-mechanism in such a way that its central axis extends in the direction of the flow, the pressure being measured at several points on the front spherical cap, preferably located at the same distance from the front nose of the flow body, and a follow-up signal for the servo-mechanism being derived from any pressure differences occurring.

It is then desirable to measure the pressure at a four points located at the same distance from the nose of the flow body and from one another, a follow-up signal being derived from each pressure difference between opposite measuring points. Particularly preferred is the use of the pressure difference signal for zero compensation of a bridge circuit which, in the unbalanced condition, controls in its turn a servo-motor or two servo-motors which rotate the flow body in planes located mutually at right angles.

In order to carry out this method, the device according to the invention is supplemented in that several holes are provided on the front spherical cap of the flow body at the same distance from the front nose of the flow body, in which holes measuring equipment is provided for measuring the pressure in the particular hole and/or for measuring pressure differences between each of the two holes, the measuring equipment emitting pressue difference signals, and that the flow body is supported at its rear end so that it can be rotated about at least one transverse axis and that a servo-mechanism, which preferably includes at least one servo-motor, is provided, to which any pressure difference signals generated are supplied and which pivots the flow body until there are no longer any pressure differences present.

It should be noted that measuring equipment such as, for example, piezo-crystals can also be let into the surface of the flow body at the measurement points instead of the holes with the measuring equipment for measuring the pressure or for measuring pressure differences between two measurement points. Such a construction is, however, expensive to manufacture and because of it, the surface of the flow body may contain inhomogeneities.

Although three pressure measurement points would provide sufficient information for the servo-control, four holes are preferred, located on the front spherical cap of the flow body at the same distance from the nose and from one another, and the pressure difference from two opposite holes provides the control signal for one servo-motor for the rotation of the flow body about a first transverse, axis whereas the pressure difference between the other pair of holes provides the control signal for a second servo-motor for rotation about a second transverse axis at right angles to the first. In this way, a large spatial angle can be covered during the rotation of the flow body.

In one embodiment of the invention, the measurement holes are connected to pressure measurement conduits which extend within the flow body. In another embodiment, a thermistor flow diode (flow sensor)—for measuring the pressure difference between two pressure tappings—is provided in a connecting piece between these tappings, this flow sensor being included in an electrical bridge circuit which is connected in turn via a servo-amplifier to a servo-motor for rotating the flow body. The pressure difference causes such a temperature difference at the thermistor flow diode (because the temperature on the higher pressure side is lower), that a balanced bridge circuit is unbalanced by the diode. As long as the bridge is unbalanced, the servo-motor is actuated via the servo-amplifier and this motor rotates the flow body until there is no longer any pressure difference and the bridge is correspondingly balanced.

In this latter embodiment, the determination of the pressure difference takes place within the flow body and only electrical leads have to be led out from the flow body.

By means of this follow-up equipment according to the invention, the measurement probe is therefore always set in the resultant flow direction so that it always operates in its optimum range. During the follow-up process, furthermore, measurement fluctuations hardly occur because the relatively wide angular measurement range of the probe is capable of compensating for the follow-up delay.

A further advantage in the case of the invention is the possibility of interrogating the angle between the travel direction and the flow direction by means of mechanically coupled angle interrogation equipment. For this purpose, a potentiometer can be adjusted by mecanical coupling during the rotation of the flow body and then provides the angle relative to a zero position. Other known angle coding equipment can also be used to interrogate and supply the deviation angle from a zero position (for example the normal to a helicopter wall).

The invention is explained in more detail below by means of embodiments and examples.

Reference is also made to the drawings provided.

Figure 1:
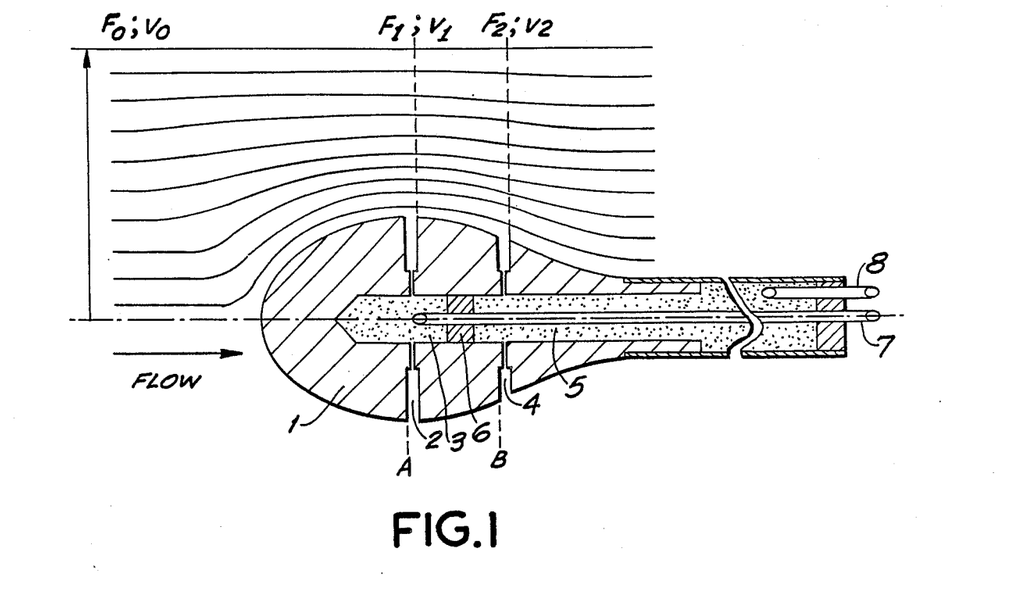
FIGS. 1, 2 and 3 show diagrammatic representations of devices according to the invention for measuring the flow velocity of a free flow in order to explain the principle of the invention.

FIG. 1 shows, diagrammatically, a device for measuring the flow velocity of a free flow in three dimensions in accordance with the invention. A flow body 1 with low aerodynamic drag in the longitudinal direction has, seen in the flow direction, holes 2 at the position A close behind its thickest position, these holes being connected to a first chamber 3 within the hollow body of rotation. The flow body also has holes 4 at a narrow position B and these holes are connected to a second body 5 within the hollow body of rotation. The first chamber 3 is separated from the second chamber 5 by a partition 6 through which a pressure conduit 7 is led to the rear end of the measurement probe. The second chamber 5 is connected to a pressure conduit 8 which is also led out of the measurement probe at the rear end of the latter.

Under the influence of a flow arriving at the front part of the measurement probe, a first static pressure $p_1$ appears in the chamber 3 via the holes 2 while the static pressure $p_2$ occurs in the second chamber 5 through the holes 4. The pressure $p_1$ can be measured at the pressure conduit 7 and the pressure $p_2$ can be measured at the pressure conduit 8. As will be shown again later, the velocity $v_0$ of the flow in the laminar region before the measurement probe is given by the relationship:

$$v_0 = \sqrt{\frac{2}{\rho}(p_1 - p_2)} \cdot G \qquad (1)$$

where G is a geometry factor which depends on the diameter of the flow body at the positions at which the static pressures are measured.

In order to explain the principle of the measurement, using FIG. 1, the following assumptions are made.

In the region of the measurement probe at the point "O", the flow is laminar and has the velocity $v_0$. Considering a circular cylindrical excerpt from the flow with a circular area $F_0$—which is sufficiently large for the perturbation of the flow due to the measurement probe to have no effect at the boundary of the circular cylinder, i.e. the streamlines again extend parallel to the axis at this position—the streamlines at the first measuring position, which corresponds to position A on the flow body, are strongly crowded together. At the position A, the flow body has the cross-sectional area $F_A$ and the annular area $F_1$ remains for the flow within the circular cylinder, the annular area being given by:

$$F_1 = F_0 - F_A$$

In an analogous manner, the following relationship applies at the level of the second measuring position B:

$$F_2 = F_0 - F_B$$

In the annular space around the probe available for the flow, the velocity increases to $v_1$ and the first measuring position and decreases sufficiently at the second measuring position so that it is then $v_2$. The following applies:

$$v_0 < v_2 < v_1.$$

From the continuity equation:

$$v_0 F_0 = v_1 F_1 = v_2 F_2. \qquad (2)$$

The static pressure p is equal to the total pressure $p_{tot}$ minus the dynamic pressure q and the total pressure $p_{tot}$ is equal at the positions A and B. The difference $p_2$ minus $p_1$ between the static pressures A and B then gives $$p_2 - p_1 = (p_{tot} - q_2) - (p_{tot} - q_1) = q_1 - q_2$$
$$= \frac{\rho}{2}(v_1^2 - v_2^2).$$

The relationship $v_1 F_1 = v_2 F_2$ gives $$p_1 - p_2 = \frac{\rho}{2} v_2^2 \left(\frac{F_2^2}{F_1^2} - 1\right)$$

$$\dot{v}_2 = \sqrt{\frac{2}{\rho} \frac{(p_1 - p_2)}{\left(\frac{F_2^2}{F_1^2} - 1\right)}}$$

Using the relationships $v_0 = v_2 F_2 / F_0$ $F_1 = F_0 - F_A$ $F_2 = F_0 - F_B$ and assuming that the flow body is rotationally symmetrical, i.e. its cross-sections are circular surfaces, simple mathematical rearrangement gives $$v_0 = \sqrt{\frac{2}{\rho}(p_1 - p_2)} \sqrt{\frac{\left(F_0 - F_A - F_B + \frac{1}{F_0} F_A \cdot F_B\right)^2}{2 F_0 (F_A - F_B) + F_B^2 - F_A^2}} \quad (3)$$

or $$v_0 = \sqrt{\frac{2}{\rho}(p_1 - p_2)} \cdot G. \quad (1)$$

In these equations, $\rho$ represents the density of the flow medium which has to be measured or that of the stationary medium in which the measurement probe is moving.

The geometry factor G includes the circular areas $F_A$, $F_B$ and $F_0$ which, as in a conventional Venturi tube, take account of the contraction of the flow duct considered. The area $F_0$ takes account of the distance from the measurement probe at which the flow is again undisturbed.

Figure 2:
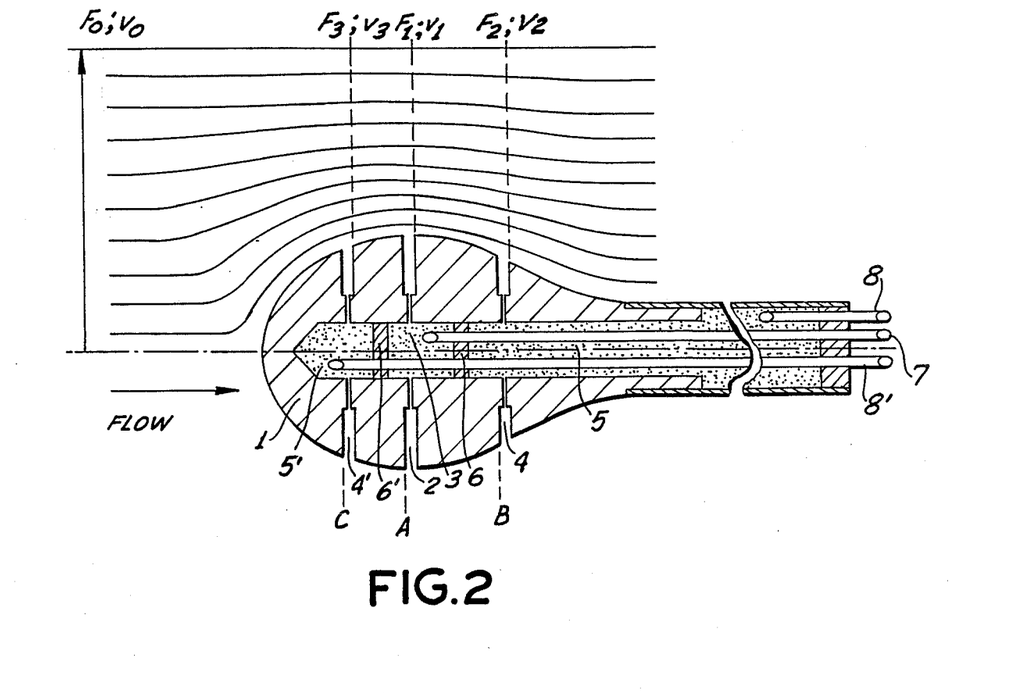

In the device shown in FIG. 2, a flow body 1 is provided with three annular measuring positions A, B and C. The additional measuring position C is then in front of the thickest position of the flow body 1 and there is, correspondingly, a second partition 6' (which separates the measurement chambers 3' and 5' from one another) in front of the thickest position. The same relationships established for the static pressures $p_2$ and $p_1$ apply to the static $p_3$ measured in the corresponding second holes 4' at the measuring position C relative to the static pressure $p_1$ at the measuring position A. The corresponding relationship is $$v_0 = \sqrt{\frac{2}{\rho}(p_1 - p_3)} \cdot G' \quad (1')$$

where G', just like G in Equation (1), is an experimentally determined geometry factor which takes account, among other things, of the compression—corresponding to the flow velocity—of the medium flowing along the flow body. By measuring the pressure differences $(p_2-p_1)$, $(p_3-p_1)$ and $(p_2-p_3)$, a sufficiently large number of parameters can be determined to calculate the density $\rho$ of the flowing medium by using the Bernoulli equation (taking account of the geometry factors) or to ascertain the flow velocity independent of the density.

These possibilities are of great advantage in many applications of the probe according to the invention—in aeronautical technology, for example—where they make altitude correction unnecessary.

Figure 3:
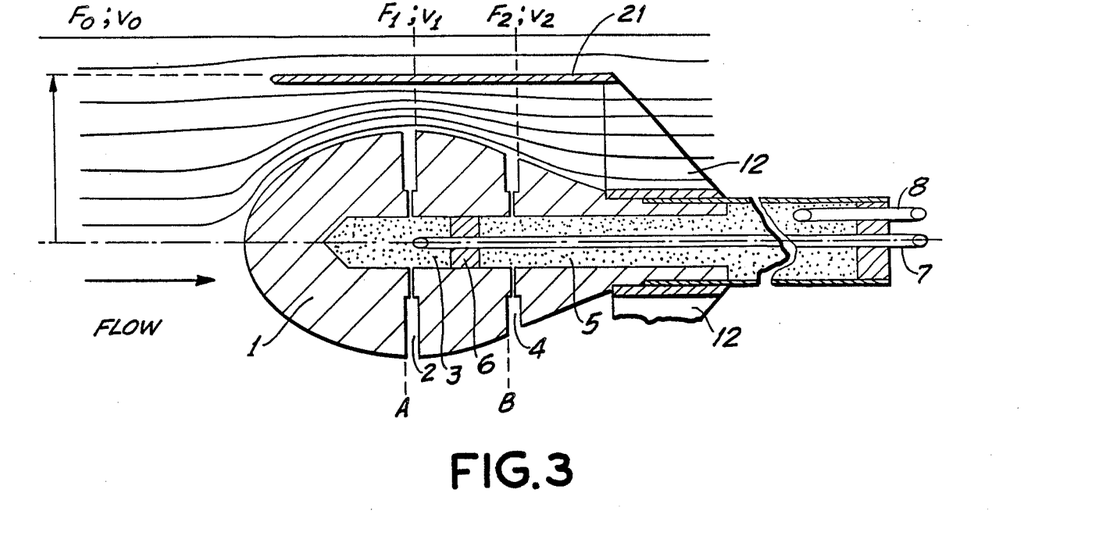

FIG. 3 explains the principle of the invention for the case where a ring 21 is arranged around the flow body 1. The flow arrives through an annular area into the annular gap in which the two measuring positions A and B are located. In the example shown, the ring 21 is a cylindrical shroud which is connected to the flow body 1 by means of struts or retention features 12.

The flow cross-section through the annular gap becomes narrow as the flow body 1 bulges outwards to a greater extent. The flow velocity $v_1$ increases correspondingly and decreases again to $v_2$ at the second measuring position B. In this case, substantial perturbation to the flow generally only occurs in the region of the ring cross-section so that, as an approximation, this circular area is equal to $F_0$. $F_1$ and $F_2$ are, correspondingly, the annular area or gap cross-sections between the ring 21 and the surface of the flow body 1 at the measuring positions A and B, respectively.

The streamline pattern shows clearly that the arrangement, the length and the diameter of the ring and its distance from the flow body 1 influence the measurement range of the probe and the screening from perturbations within the flow.

It should be noted that an oblique position of the measurement probe relative to the flow, i.e. an increase in the blowing angle, does not cause any measurement errors, particularly when the front end surface of the flow body 1 is a spherical cap.

The flow to be measured meets the spherical cap and adheres to the spherical surface so that, on entry to the annular gap, it is accelerated on one side and retarded on the other side, so that a precursor average occurs due to the all-round measurement (around the flow body) and this explains the marked independence of blowing angle found in the measured velocity values.

Figure 4:
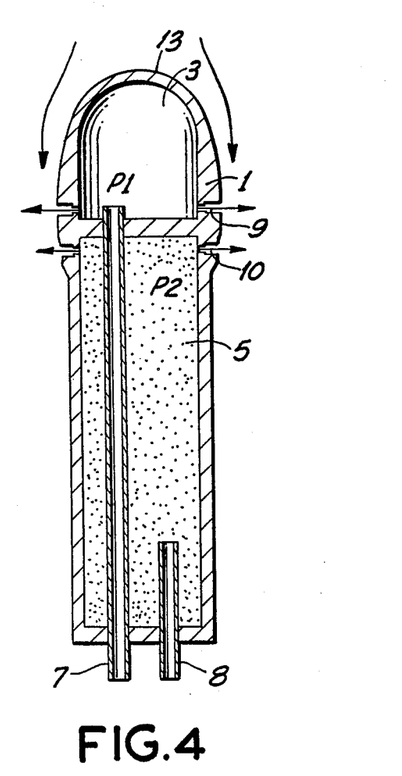
FIG. 4 shows an embodiment of the device according to the invention.

The measurement probe according to the invention shown in FIG. 4 has two peripheral annular slots 9 and 10 which are respectively connected for pressure purposes to the corresponding chambers 3 and 5. The annular slot 9 is located at the thickest position of the flow body 1 and the annular slot 10 is located very close downstream behind the annular slot 9 at a position at which the flow body begins to become narrower. The static pressures $p_1$, $p_2$ are led out via the measurement conduits 7 and 8 from the probe and can be measured by means of known measurement equipment.

Figure 5:
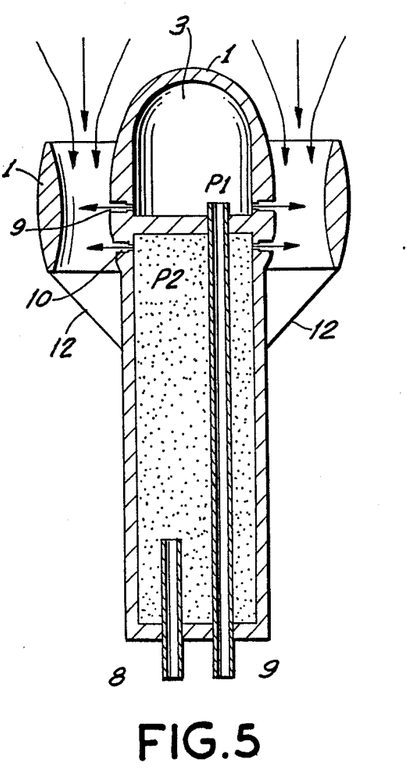
FIG. 5 shows another embodiment of the device according to the invention, shown in FIG. 4, with a ring.

Another embodiment of the device according to the invention is shown in FIG. 5 and this, on the one hand, contains the measurement probe shown in FIG. 4 and, on the other, is surrounded by a ring 11. The cross-section of the annular partition also has an aerodynamically favourable shape. It surrounds the flow body 1 in such a way that it causes contraction of the annular flow duct between the measurement head surface and the internal surface of the ring in front of the first annular slot 9 so that the first measuring position is located at the throat of the annular flow duct. The flow velocity is increased most strongly at this point and, correspondingly, the static pressure $p_1$, which is measured in the measurement chamber 3, is reduced most strongly. The ring 11 continues in such a way that the annular flow duct has widened again substantially at the position of the annular slot 10 so that the static pressure $p_2$ is substantially higher than the static pressure $p_1$. From this point, the medium to be measured flows freely and without the formation of eddies out of the measurement space.

The ring 21 is fastened to the measurement head by means of supports 12 which cause little disturbance to the flow. In the test stage—if optimum conditions have to be found for the design parameters of the ring 21—these supports 12 can be fastened to an annular retention feature which can slide on the measurement probe.

Figure 6:
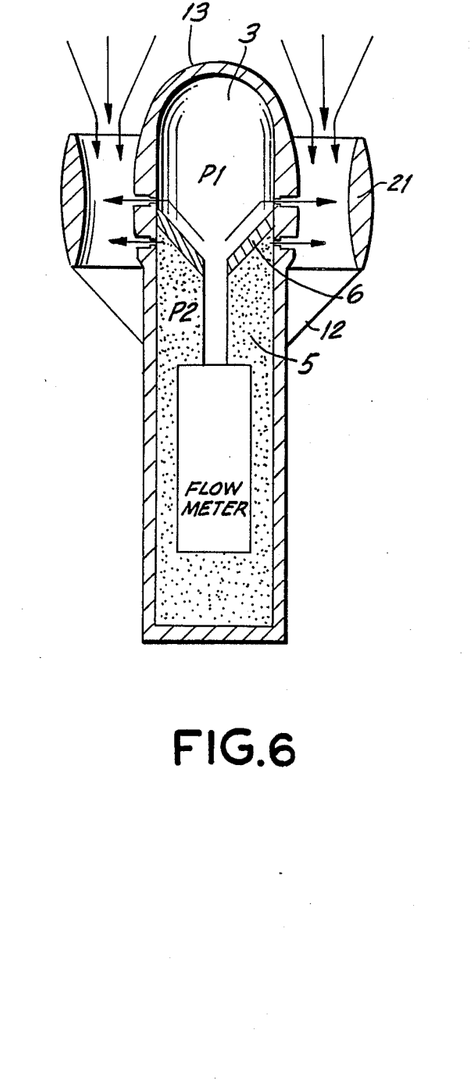
FIG. 6 shows yet another embodiment of the device according to the invention.

FIG. 6 shows a further embodiment of the device according to the invention in which the pressure difference $p_1-p_2$ is measured directly. Both known mechanical pressure difference measurement equipment and, for example, diaphragms (whose deflection is preferably measured electrically) can be used as measurement equipment. Such a measurement principle is appropriate where high pressure differences have to be measured.

In the case of small pressure differences $p_1-p_2$, flow measurement has been found to be advantageous. There is a connecting duct between the chambers 3 and 5 and an electronic component is located in the connecting duct and responds to the cooling effect due to the flow in it caused by the pressure drop. Thermistors, diodes or resistors can, for example, be used for this purpose; these are located in the connecting duct and are measured in electronic circuits. It is possible either to measure the cooling of the heat-sensitive electronic component itself or, alternatively, a combination of two such components, for example two diodes, is arranged directionally in the connecting duct and installed in a bridge circuit as the bridge elements. When one component is cooler than the other, the bridge becomes unbalanced and the voltage, the current or the energy necessary for balancing the bridge gives a measure of the pressure difference.

In this case, either the electrical connecting leads are led sealed through the wall of the measurement probe in known manner or the electricity supply takes place by radio in known manner and, similarly, the measurement data are transmitted by radio.

The advantage of this encapsulated embodiment of the measurement probe is that it is practically impossible for the measurements to be disturbed by the probe becoming dirty.

When such probes are installed in aircraft, rockets or other flying bodies, icing can easily occur at the flow duct and/or at the measurement holes. It is therefore desirable to provide heating equipment which always keeps the probe wall above a specified temperature so that no ice formation can occur.

Figure 7:
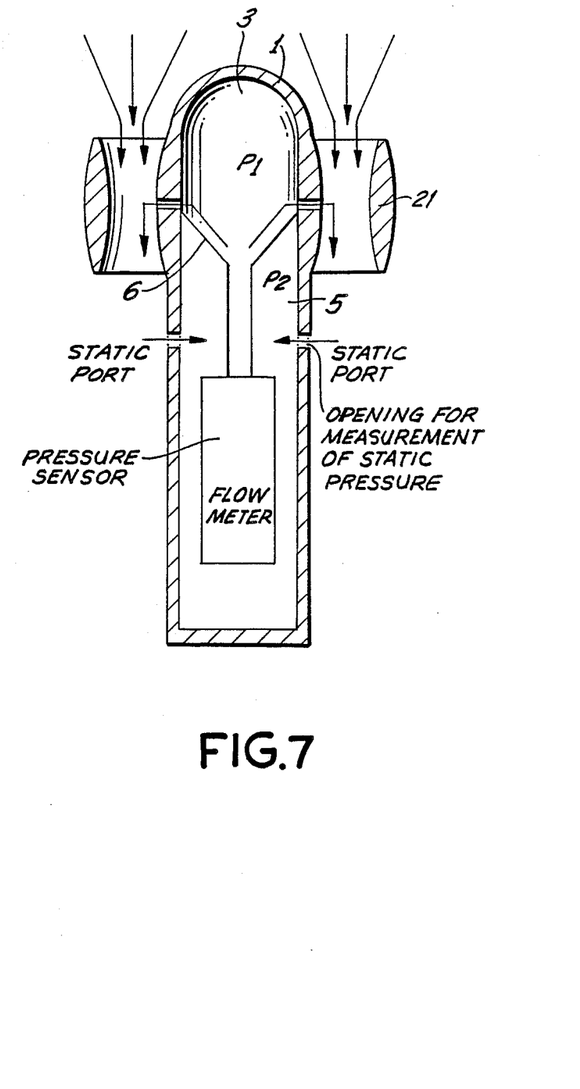
FIG. 7 shows another embodiment of the device according to the invention, similar to the embodiment shown in FIG. 6.

Finally, FIG. 7 shows yet another embodiment of the device according to the invention, its construction being similar to the measurement probe shown in FIG. 6. In this case, however, the second measuring position is located further away from the first measuring position at the rear shaft of the measurement probe designed as the retention part. The flow which flows through the annular flow duct has been substantially evened out again at the second measuring position so that the prevailing barometric pressure can be taken as being the static pressue at this measuring position, in a similar manner to a pressure probe described at the beginning. In flying bodies, knowledge of this barometric or static pressure is necessary for determining the altitude.

In this case, the measurement equipment includes both measurement equipment for determining the pressure difference $p_1-p_2$ and further measuring equipment for determining the static pressure $p_2$.

Figure 8:
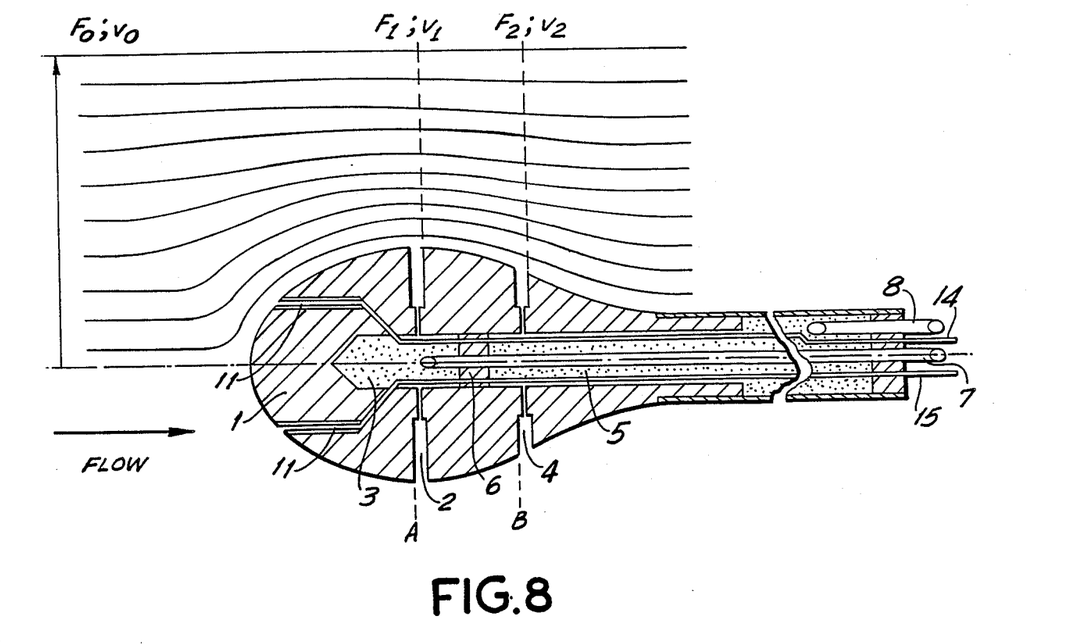
FIG. 8 shows a diagrammatic representation of yet another embodiment of the device according to the invention.
Figure 9:
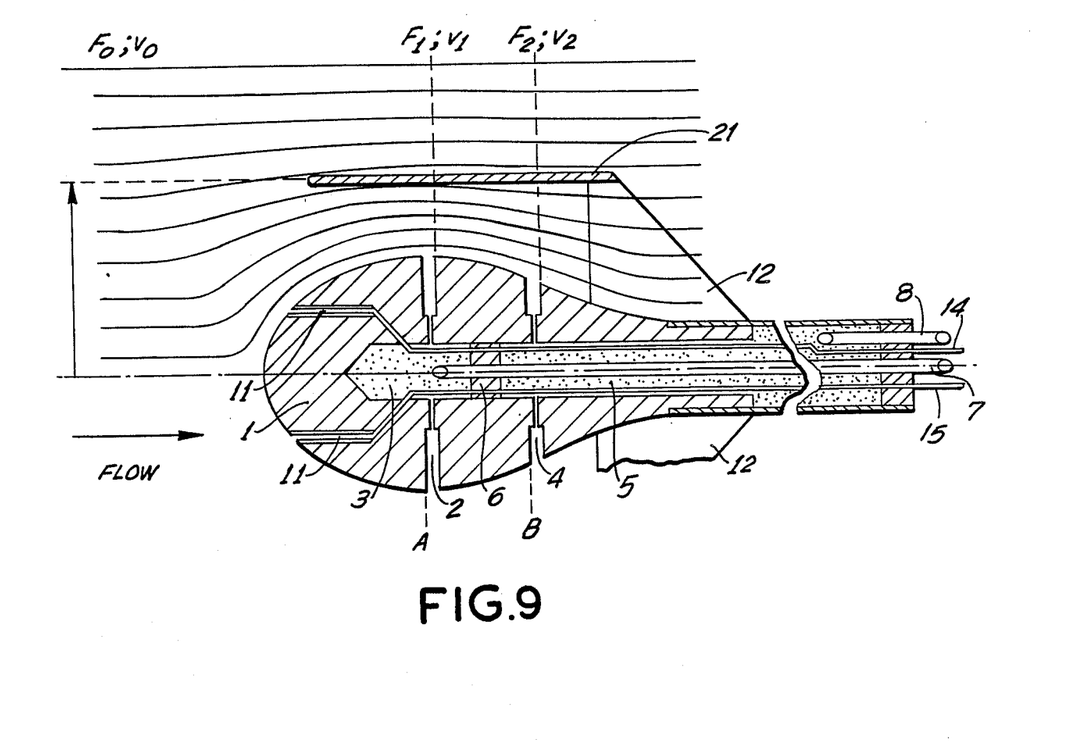
FIG. 9 shows another embodiment of the device shown in FIG. 8 witha ring and FIG. 10 a diagrammatic block circuit diagram of an arrangement by means of which the method for aligning the device in the flow can be carried out.

In FIGS. 8 and 9, which correspond to FIGS. 1 and 3, the flow body 1 has two holes 11 which are located in one plane and are at equal distances from the front nose of the flow body. The holes 11, 11 are connected to pressure measurement conduits 14, 15, which are led out of the measurement body at the rear. The pressure difference between the pressure measurement conduits 14 and 15 can be determined in known manner and is used for controlling a servo-motor which rotates the flow body (towards the top or the bottom in the example shown) until no further pressure difference is measured. The servomotor and the retention feature with bearing for rotation purposes located in the rear part of the flow body are known components which are omitted in FIGS. 8 and 9 for reasons of simplicity.

In the same way, the flow body can be rotated in a plane at right angles to the one already described (out of the plane of the paper in the example illustrated) in order to deal with a spatial angle.

In a further advantageous embodiment of the invention, the holes 11 are connected together by means of a tubular connecting piece within the flow body, in which is located a thermistor flow diode. A pressure difference in the holes 11 causes a temperature difference on the flow diode; this affects an electrical bridge circuit which includes the thermistor flow diode. In this way, only electrical measurement leads have to be led out of the flow body and the pressure measurement conduits 14, 15 end within the flow body.

Figure 10:
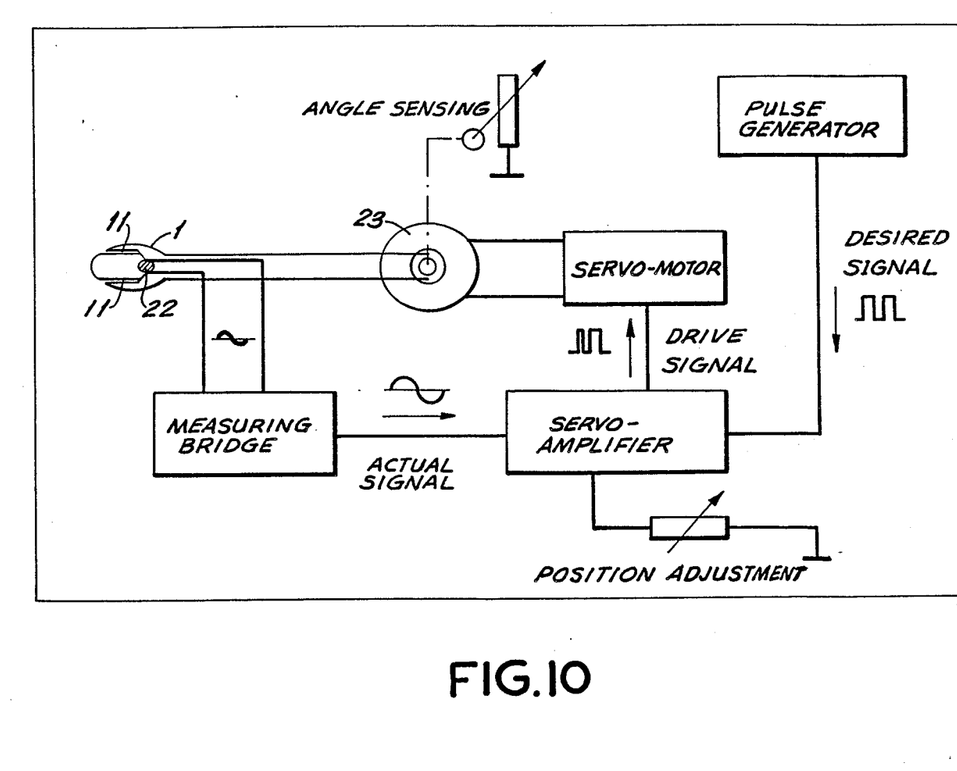

FIG. 10 shows a diagrammatic block circuit diagram used to explain a preferred embodiment of the method according to the invention.

In FIG. 10, the flow body 1 is only shown diagrammatically; it is held at its rear end in a rotating bearing 23 which is driven by a servo-motor. This servo-motor receives a setting signal via a servo-amplifier when the measurement bridge is unbalanced. The measurement bridge includes a direct or indirect pressure-sensitive element which scans the pressure difference between the holes 11, 11. In the example shown, a thermistor flow diode 22, whose electrical leads are led to the measurement bridge, is located in a connecting conduit between the holes 11, 11. In the case of a pressure difference, the ACTUAL signal differs from the REQUIRED signal, which is supplied to the servo-motor by a pulse generator, and the servo-motor is actuated via the servo-amplifier until the pressure difference is again zero.

The positional adjustment of the initial or reference position of the probe can be undertaken by means of a potentiometer.

FIG. 10 also shows angle interrogation equipment which interrogates the angular magnitude by which the flow body 1 has been rotated relative to the initial or reference position. For this purpose, a potentiometer is mechanically connected to the rotational bearing 23 and is adjusted by the rotation of the latter. The voltage measured at the potentiometer can be directly processed electrically as the angular magnitude signal.

I claim:

1. A device for measuring the flow velocity of a free fluid flow in space, comprising an elongated aerodynamic flow body having a measuring head rotationally symmetrical about an axis and of varying thickness along said axis, said body defining an internal space divided by a partition into two chambers, said head having first and second sets of peripherally-spaced openings in the side of said head in spaced relationship with a foremost tip thereof, said first openings being located in a thicker region of said head and communicating with one of said chambers, and said second openings being located in a thinner region of said head and communicating with the other of said chambers, and means for obtaining a measurement of the pressure in each chamber, whereby a flow velocity dependent pressure difference between the static pressures within said chambers may be determined.

2. The device of claim 1 wherein the openings comprise peripheral slots connected by holes to said internal space.

3. The device of claim 1 wherein said second openings are located upstream of said first openings.

4. The device of claim 1 wherein said second openings are located downstream of said first openings.

5. The device of claim 1 wherein said body has an additional partition dividing said internal space into a third chamber, said head has a third set of periherally spaced openings located at a side position of said head in a region of different thickness than the locations of said first and second sets of openings, said third set communicating with said third chamber, and means are provided for obtaining a measurement of the static pressure in said third chamber, whereby both density and velocity of the fluid flow may be determined from the measured pressure differences in said three chambers.

6. The device of claim 1 wherein the front of said head is generally spherically shaped.

7. The device of claim 1 also comprising a ring partition, and means for supporting said ring partition on said body around and in spaced relation to said body.

8. The device of claim 7 wherein said ring partition has a changing cross-section in the longitudinal direction of said flow body with the largest cross-section of said partition located opposite said first openings, whereby the distance between said partition and said flow body is smallest at said first openings.

9. The device of claim 1 wherein the means for obtaining a pressure measurement in each chamber comprises a fluid conduit extending into the chamber from a rear outside end of the body.

10. The device of claim 1 wherein the means for obtaining a pressure measurement in each chamber comprises pressure sensing electrical equipment located within said flow body.

11. The device of claim 1 wherein the rear of said flow body is supported for rotation about at least one transverse axis, said spherical front of said head has at least two spaced diametrically-opposed holes equidistant from the foremost tip of said head portion, means are provided for generating electric signals measuring the pressure difference between said holes, and at least one servo motor is connected to receive said signals and to rotate said body around said axis in response thereto until said pressure difference is reduced to zero.

12. The device of claim 10, wherein said body is supported for rotation about two transverse axes perpendicular to one another, said front of said head has two sets of diametrically opposed holes equidistant from said foremost tip, said holes being equally spaced from one another, and two servo-motors ae provided, each servo-motor being connected to receive said generated pressure difference measuring electric signals and to rotate said body around a respective axis in response to the pressure difference between a respective set of holes.

13. The device of claim 1, wherein the front of said head is of generally elliptical shape for measurements in ranges between subsonic and supersonic flow.

14. The device of claim 1, wherein the front of said head is shaped as a supersonic profile.

15. The method of measuring the flow velocity of a free fluid flow in space around an elongated rotationally symmetrical flow body of varying thickness, comprising measuring the static pressures existing at two or more longitudinally-spaced side positions within the pressure distribution along the flow body, one measuring position being located in a thicker region of said body and a second measuring position being located at a thinner region of said body but each being spaced from a foremost tip of said body, and utilizing the difference in said measured pressures to determine the flow velocity.

16. The method of claim 15 wherein the static pressures are measured at three different longitudinally spaced positions along the side of said body in regions of different thickness, the pressure differences from each two measuring positions are measured, and the density of the flowing fluid is determined from the relationships between said pressure differences whereby the flow velocity can be obtained without an independent density measurement.

17. The method of claim 15 also comprising the steps of measuring the pressures at spaced points on the front surface of the flow body equidistant from the foremost point of the body, generating electric signals representing differences in the pressures measured at said spaced points, and mechanically aligning the flow body in the direction of the fluid flow in response to said electric signals by zero balancing.

* * * * *